United States Patent
Imran et al.

(10) Patent No.: US 9,267,429 B2
(45) Date of Patent: Feb. 23, 2016

(54) EMISSION REDUCTION FROM MOBILE SOURCES BY ON-BOARD CARBON DIOXIDE CONVERSION TO FUEL

(71) Applicant: Saudi Arabian Oil Company, Dhahran (SA)

(72) Inventors: Hasan Imran, Dhahran (SA); Muased Salem Musaed Al-Ghrami Al-Ghamdi, Dhahran (SA); Aadesh Harale, Abqaiq (SA); Jean-Pierre R. Ballaguet, Dhahran (SA); Aqil Jamal, Dhahran (SA)

(73) Assignee: Saudi Arabian Oil Company (SA)

( * ) Notice: Subject to any disclaimer, the term of this patent is extended or adjusted under 35 U.S.C. 154(b) by 0 days.

(21) Appl. No.: 14/485,872

(22) Filed: Sep. 15, 2014

(65) Prior Publication Data

US 2015/0000615 A1   Jan. 1, 2015

Related U.S. Application Data (63) Continuation of application No. 13/659,305, filed on Oct. 24, 2012, now Pat. No. 8,863,701.

(60) Provisional application No. 61/550,699, filed on Oct. 24, 2011.

(51) Int. Cl.
*F02B 43/08* (2006.01)
*F02B 43/12* (2006.01)
(Continued)

(52) U.S. Cl.
CPC ............... *F02B 43/12* (2013.01); *B01D 53/229* (2013.01); *B01D 53/92* (2013.01); *B01J 23/462* (2013.01);
(Continued)

(58) Field of Classification Search
CPC ............... B01D 2257/504; B01D 2257/80; B01D 53/02; F02M 27/02; F02M 31/08
USPC .......... 123/3, 1 R, DIG. 12; 422/162
See application file for complete search history.

(56) References Cited

U.S. PATENT DOCUMENTS 3,779,013 A   12/1973   Faber et al.
3,903,694 A   9/1975   Aine
(Continued)

OTHER PUBLICATIONS

S. Tajammul Hussain et al., "Nano Catalyst for CO2 Conversion to Hydrocarbons," Journal of Nano Systems & Technology vol. 1, No. 1; Oct. 31, 2009; pp. 1-9.
(Continued)

*Primary Examiner* — Lindsay Low
*Assistant Examiner* — Long T Tran
(74) *Attorney, Agent, or Firm* — Bracewell LLP; Constance Gall Rhebergen; Linda L. Morgan (57) ABSTRACT

An apparatus and process for reducing vehicle emissions by converting exhaust gases to hydrocarbon fuel. The apparatus and process supplement conventional emission control techniques to further reduce vehicle emissions of harmful substances. The apparatus includes a heat exchanger to extract thermal energy from exhaust gases of a combustion engine that powers propulsion of a vehicle, a membrane separator to separate water and carbon dioxide from the exhaust gases, and a catalytic reactor comprising a nano catalyst. The catalytic reactor receives the water and the carbon dioxide from the membrane separator, contains a reaction of the water and the carbon dioxide that produces hydrocarbon fuel and is facilitated by the nano catalyst, and uses the thermal energy from the heat exchanger to stimulate the reaction. The catalytic reactor is contained within a body of the heat exchanger to facilitate the transfer of thermal energy.

16 Claims, 4 Drawing Sheets (51) Int. Cl.
   *B01J 23/46* (2006.01)
   *B01D 53/92* (2006.01)
   *B01J 23/89* (2006.01)
   *C10G 2/00* (2006.01)
   *B01D 53/22* (2006.01)
   *B01J 35/00* (2006.01)
   *F02M 27/02* (2006.01)
   *F02M 31/08* (2006.01)
   *B01J 21/06* (2006.01)
   *B01J 23/34* (2006.01)
   *B01J 23/755* (2006.01)
   *B01D 71/02* (2006.01)

(52) U.S. Cl.
   CPC .......... *B01J 23/8986* (2013.01); *B01J 35/0013* (2013.01); *C10G 2/00* (2013.01); *F02M 27/02* (2013.01); *F02M 31/08* (2013.01); *B01D 71/021* (2013.01); *B01D 71/027* (2013.01); *B01D 71/028* (2013.01); *B01D 2257/504* (2013.01); *B01D 2257/80* (2013.01); *B01D 2259/65* (2013.01); *B01J 21/063* (2013.01); *B01J 23/34* (2013.01); *B01J 23/755* (2013.01); *C10G 2300/405* (2013.01); *Y02C 10/10* (2013.01); *Y02T 10/126* (2013.01)

(56) References Cited

U.S. PATENT DOCUMENTS

| | | | |
|---|---|---|---|
| 5,229,102 A | | 7/1993 | Minet et al. |
| 5,785,030 A | | 7/1998 | Paas |
| 6,079,373 A | * | 6/2000 | Kawamura ............ F01N 3/0857 123/3 |
| 6,769,244 B2 | | 8/2004 | Headley et al. |
| 7,040,088 B2 | | 5/2006 | Covit |
| 7,296,400 B2 | | 11/2007 | Nakada |
| 7,563,415 B2 | | 7/2009 | Zuberi |
| 7,757,676 B2 | | 7/2010 | Cracknell |
| 2003/0196427 A1 | | 10/2003 | Kong et al. |
| 2004/0112349 A1 | | 6/2004 | Livingston et al. |
| 2004/0200209 A1 | * | 10/2004 | Kirwan .................. B01D 53/02 60/284 |
| 2008/0010976 A1 | | 1/2008 | Lohberg |
| 2008/0283411 A1 | | 11/2008 | Eastman et al. |
| 2008/0309087 A1 | | 12/2008 | Evulet et al. |
| 2009/0194741 A1 | * | 8/2009 | DaCosta ................ B01D 53/90 252/372 |
| 2010/0018478 A1 | | 1/2010 | Tamma et al. |
| 2010/0192937 A1 | | 8/2010 | Vacca et al. |
| 2010/0229841 A1 | | 9/2010 | Nakayama et al. |
| 2010/0300114 A1 | | 12/2010 | Mhadeshwar et al. |
| 2011/0239622 A1 | | 10/2011 | Hancu et al. |

OTHER PUBLICATIONS

International Search Report with Written Opinion issued in related PCT Patent Application No. PCT/US2012/061603; dated Dec. 19, 2012; 13 pages.

* cited by examiner

EMISSION REDUCTION FROM MOBILE SOURCES BY ON-BOARD CARBON DIOXIDE CONVERSION TO FUEL

CROSS REFERENCE TO RELATED APPLICATIONS

This patent application is a continuation application of U.S. patent application Ser. No. 13/659,305, filed on Oct. 24, 2012. This patent application claims priority from U.S. Provisional Patent Application No. 61/550,699, filed Oct. 24, 2011. For purposes of United States patent practice, this application incorporates the contents of the prior Applications by reference in their entirety.

TECHNICAL FIELD OF THE INVENTION

The present invention relates to a process for reducing vehicle emissions by converting carbon dioxide to hydrocarbon fuel. More specifically, embodiments of the present invention utilize an on-board heat exchanger and catalytic converter to convert vehicle exhaust into hydrocarbon fuel for the vehicle's combustion engine.

BACKGROUND OF THE INVENTION

The automobile industry has recognized for decades that vehicle emissions are harmful to the public health and the environment. It is also well-known that conventional methods of reducing vehicle emissions are inefficient. Typically, vehicle emissions may be reduced by increasing engine efficiency and/or cleansing the exhaust after combustion. For example, vehicle exhaust may be cleansed using secondary air injection, exhaust gas recirculation, and/or catalytic conversion.

Typically, a catalytic converter includes metallic catalyst(s) (e.g., platinum, palladium, rhodium) for converting toxic emissions into non-toxic substances. The toxic emissions converted may include carbon monoxide, nitrogen oxides, and unburned hydrocarbons. For example, the carbon monoxide may be oxidized and converted to carbon dioxide, where the catalyst stimulates the oxidation.

The use of a catalytic converter fails to resolve all the challenges related to reducing vehicle emissions. For example, catalytic converters fail to reduce the amount of hydrocarbon fuel being combusted. Further, catalytic converters produce carbon dioxide, which is a greenhouse gas that contributes to global warming.

Therefore, it would be desirable to have an improved process for reducing vehicle emissions. Preferably, it would be desirable to have a process that converts emissions into usable fuel. Further, it would be desirable to have a process that also reduces the amount of carbon dioxide being emitted.

SUMMARY OF THE INVENTION

In one embodiment, the apparatus for emission reduction from mobile sources includes a heat exchanger to extract thermal energy from exhaust gases of a combustion engine, the combustion engine powering propulsion of a vehicle; a membrane separator to separate water and carbon dioxide from the exhaust gases; and a catalytic reactor having a nano catalyst, the catalytic reactor to contain a reaction of the water and the carbon dioxide that produces hydrocarbon fuel, the reaction being facilitated by the nano catalyst. In one embodiment, the catalytic reactor receives the water and the carbon dioxide from the membrane separator and uses the thermal energy from the heat exchanger to stimulate the reaction of the water and the carbon dioxide.

In one embodiment, the nano catalyst is a multimetallic nano catalyst that includes at least one of ruthenium, manganese, and nickel. In another embodiment, the nano catalyst is about 2 to 3 percent ruthenium, about 20 to 30 percent nickel, and about 15 to 20 percent manganese. In yet another embodiment, the nano catalyst is about 2 percent ruthenium, about 20 percent nickel, and about 15 percent manganese.

In one embodiment, the membrane separator includes a selective membrane layer that is a silica-based membrane layer, a carbon-based membrane layer, or a zeolite membrane layer and a support layer that is a ceramic support, a metallic support, or an alumina support.

In one embodiment, the catalytic reactor is encompassed by the heat exchanger such that the thermal energy is directed to a portion of the catalytic reactor holding the nano catalyst. In one embodiment, the catalytic reactor includes multiple tubes for holding the nano catalyst, the multiple tubes providing increased surface area for receiving the thermal energy from the heat exchanger.

In one embodiment, the hydrocarbon fuel includes ethanol and propyne.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION

While the invention will be described in connection with several embodiments, it will be understood that it is not intended to limit the invention to those embodiments. On the contrary, it is intended to cover all the alternatives, modifications and equivalence as may be included within the spirit and scope of the invention defined by the appended claims.

In one embodiment, an apparatus for emission reduction of vehicles includes a heat exchanger for extracting thermal energy from exhaust gas of a combustion vehicle, the combustion engine powering propulsion of a vehicle; a membrane separator for separating water and carbon dioxide from the exhaust gas; and a catalytic reactor comprising a nano catalyst for containing a reaction of the water and carbon dioxide that produces hydrocarbon fuel. Further, the thermal energy extracted by the heat exchanger stimulates the reaction of the water and the carbon dioxide.

Figure 1:
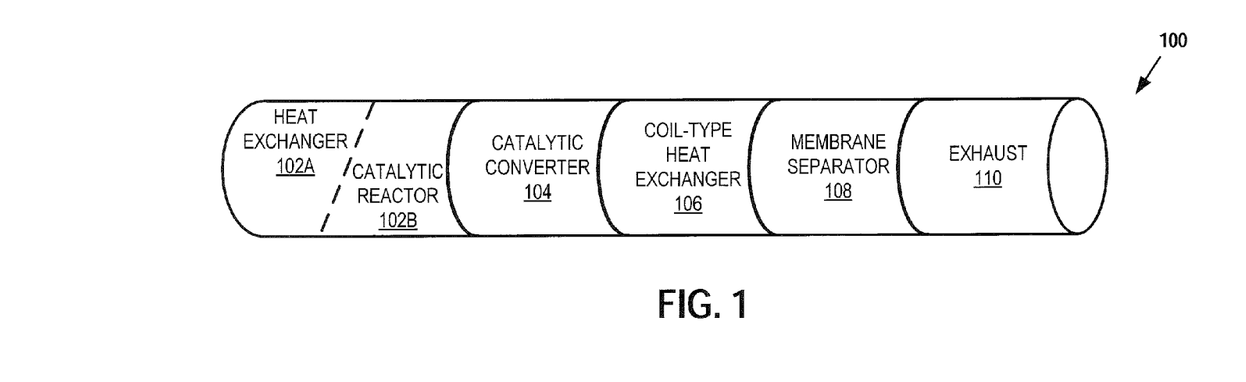
FIG. 1 shows an apparatus in accordance with one or more embodiments of the present invention.

As shown in FIG. 1, the apparatus 100 comprises an integrated heat exchanger 102A and catalytic reactor 102B, a catalytic converter 104, a coil-type heat exchanger 106, a membrane separator 108, and an exhaust 110. In one embodiment, the apparatus 100 is incorporated into the exhaust system of a vehicle (e.g., installed on the undercarriage of the vehicle) as discussed below with respect to FIG. 3.

In one embodiment, the heat exchanger 102A and catalytic reactor 102B are integrated so that thermal energy extracted from exhaust gases in the heat exchanger 102A can be used to stimulate a reaction in the catalytic reactor 102B. The heat exchanger 102A receives the exhaust gases from a combustion engine. Thermal energy is extracted from the exhaust gases as they pass through the heat exchanger 102A thereby cooling down the exhaust gases before the exhaust gases enter the catalytic converter 104. The heat exchanger 102A allows for (1) waste heat to be recovered from the engine and used by the catalytic reactor 102B and (2) exhaust gases to be cooled before entering the other components of the apparatus 100. For example, the membrane separator 108 can include a membrane that operates at relatively high pressure and temperatures lower than the temperature of the exhaust gas exiting the combustion engine.

In some embodiments, the catalytic reactor 102B includes a catalytic system, a photo-catalytic system, an electro-catalytic system, or suitable combination thereof. Further, the catalytic reactor 102B can include a fixed, fluidized bed and a catalytic membrane. The catalyst can be a supported nano-structure catalyst that includes alumina, silica, and clay as support and active monometallic, bi-metallic and tri-metallic materials as active ingredients as discussed below.

In one embodiment, the catalytic reactor 102B contains a reaction to convert $CO_2$ and $H_2O$ to hydrocarbon fuel. For example, the reaction can be a general reaction to produce alcohols such as: $nCO_2+(n+1)H_2O \rightarrow C_nH_{2n+1}OH+(3n/2)O_2$, where n=1, 2, 3, 4, 5, 6, etc. (e.g., when n=1 then the product is $CH_3OH$ (methanol), when n=2 then the product is $C_2H_5OH$ (ethanol), etc.). In another example, the reaction can be targeted for alkane production such as: $2nH_2O+nCO_2 \rightarrow C_nH_{2n+2}+2nO_2$, where n=1, 2, 3, 4, 5, 6, etc. In yet another example, the reaction can produce methane ($CH_4$) or mixed products with the release of oxygen as shown in the following reactions:

A catalyst stimulated reaction producing ethanol, propyne, and oxygen at 673 K and atmospheric pressure—$5CO_2+5H_2O \rightarrow C_2H_5OH+H_3C-C\equiv CH+7O_2$ A catalyst stimulated reaction producing methanol, ethanol, oxygen, and propyne—$6CO_2+7H_2O \rightarrow CH_3OH+C_2H_5OH+17/2O_2+H_3C-C\equiv CH$ In this example, the catalyst and reaction temperature can be tailored to maximize the production of certain products (e.g., ethanol). Further, the nano catalyst used by the catalytic reactor 102B can be a metallic nano catalyst including ruthenium, manganese, and/or nickel. Specifically, the metallic nano catalyst can be about 2 to 3 percent ruthenium, about 20 to 30 percent nickel, and about 15 to 20 percent manganese (e.g., 2 percent Ruthenium, 20 percent Nickel, and 15 percent Manganese). The reaction can be stimulated by the catalyst when $H_2O$ (steam) and $CO_2$ decompose over the nano catalyst surface to produce oxygen and hydrogen. At this stage, the hydrogen and oxygen can react with the carbon to produce the hydrocarbon fuel. In some cases, nascent oxygen resulting from the reaction can result in the generation of additional energy, which reduces the requirement for external thermal energy.

An example nano catalyst is described in Hussain S. T., et al., *Nano Catalyst for $CO_2$ Conversion to Hydrocarbons*, Journal of Nano Systems & Technology, Oct. 31, 2009. In this article, the example nano catalyst is prepared as follows:

A solution of ruthenium trichloride (0.103 g), manganese nitrate tetrahydrate (2.285 g) and nickel nitrate hexahydrate (2.47 g) (analar grade) is prepared in deionized $H_2O$ and acidified with dilute hydrochloric acid to prevent the precipitation of hydroxide.

A portion of the slurry (10 cm3) is then added to a titanium dioxide catalyst support (3.95 g), (350 $m^2g^{-1}$) in an evaporation basin, where the mixture is magnetically stirred for 20 minutes and dried at 395 K overnight.

The prepared catalyst sample is then calcined in air for 6 hours at 600° C.

Based on a typical driving cycle (e.g. the USO6 drive cycle), exhaust gases can be emitted from 6.5 grams/sec to 200 grams/sec depending the speed of the vehicle. In this case, the maximum speed in the driving cycle is around 80 mph, which can be used to calculate a quantity of catalyst for commercial purposes. In laboratory tests, the amount of catalyst used was 0.5 grams, where the corresponding space velocity of the exhaust through the reactor was 6000-7200 $hr^{-1}$. Comparatively, the exhaust mass flow rate through a vehicle can vary from 6.5 g/s to 200 g/s. In some embodiments, based on the laboratory quantity and the typical driving cycle, the total amount of catalyst used in the catalytic reactor 102B is about 120 grams. In this case, the level of conversion of in the reactor is dependent on the exhaust mass flow rate (i.e., the conversion rate in the reactor increases as the exhaust mass flow rate decreases).

In one embodiment, the catalytic converter 104 cleanses toxic substances from the vehicle exhaust. Specifically, the catalytic converter 104 can include metallic catalysts for (1) oxidizing carbon monoxide to generate $CO_2$ and (2) oxidizing unburned hydrocarbons to generate $H_2O$ and $CO_2$. The reactions in the catalytic converter 104 increase the temperature of the exhaust gases before they are passed to a coil type heat exchanger 106.

In one embodiment, the coil type heat exchanger 106 reduces the temperature of the exhaust gas before it is provided to the membrane separator 108. The coil type heat exchanger 106 can transfer thermal energy from the exhaust gas to reactants traveling towards the catalytic reactor 102B.

In one embodiment, the membrane separator 108 separates $CO_2$ and $H_2O$ from the other gases of the exhaust gases received from the coil type heat exchanger 106. The membrane separator 108 can include a variety of membranes, where the $CO_2$ and $H_2O$ is separated as permeate or retenate depending on the operating conditions (e.g., temperature). The separated $CO_2$ and $H_2O$ are passed to the catalytic reactor 102B, and the other gases as passed to the exhaust 110. The exhaust 110 can then emit the other gases from the vehicle.

Figure 2:
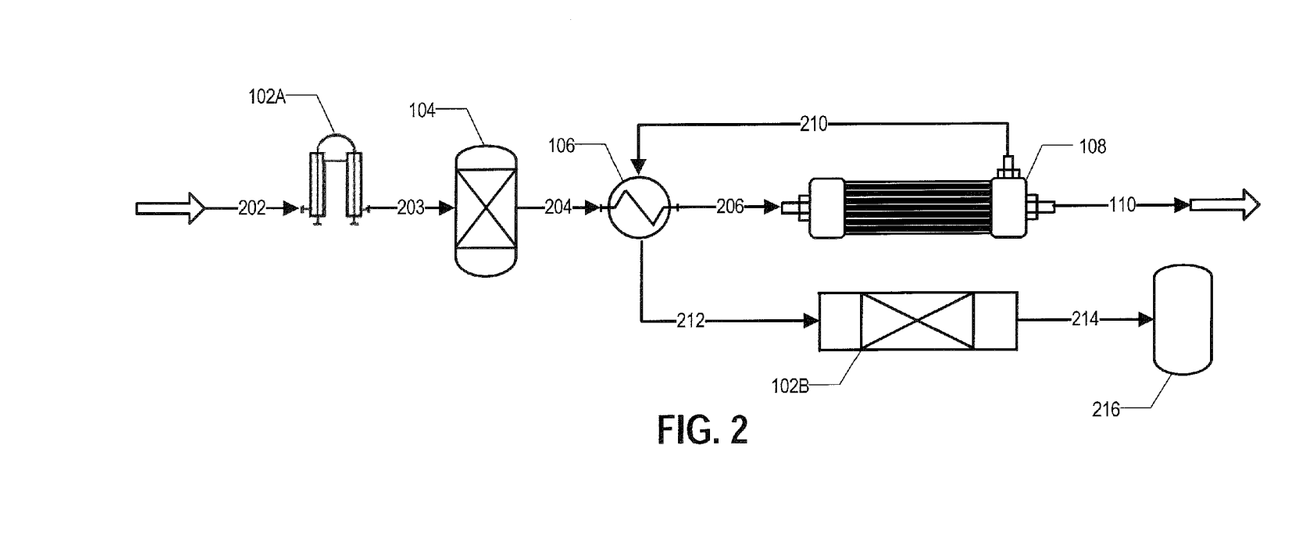
FIG. 2 shows a process flow in accordance with one or more embodiments of the present invention.

Turning to FIG. 2, an example process flow for converting exhaust gases to hydrocarbon fuel is shown. In 202, the exhaust gases leaving the vehicle engine enter a double-pipe heat exchanger 102A at a temperature of about 850° C. (i.e., the exhaust gases contain energy in the form of heat generated from combustion in the vehicle engine). The double-pipe heat exchanger 102A extracts thermal energy from the exhaust gases before emitting the exhaust gas in 203. The exhaust gases leave the double-pipe heat exchanger 102A at a temperature of about 350-500° C. before entering the catalytic converter 104. In the catalytic converter 104 reactions occur to convert unburned gaseous components into $N_2$, $CO_2$, $H_2O$, etc. In 204, the converted gases leave the catalytic converter 106 at a temperature of about 500-600° C.

The converted gases then pass through a coil type heat exchanger 106 to transfer further heat to reactants moving towards the catalytic reactor 102B. In 206, the converted gases enter the membrane separator 108 at about 200-300° C. In the membrane separator 108, $CO_2$ and $H_2O$ are separated from the converted gases. In 210, the separated $CO_2$ and $H_2O$ pass through the coil-type heat exchanger 106 to raise the temperature of the $CO_2$ and $H_2O$ to about 500° C. In 110, the remaining gases leave the membrane separator 108 and are emitted from the vehicle as exhaust. In 212, the heated $CO_2$ and $H_2O$ are passed to the catalytic reactor 102B. In the catalytic reactor 102B, a nano catalyst stimulates a reaction that converts the $CO_2$ and $H_2O$ into hydrocarbon fuel. In 214, the hydrocarbon fuel is recycled into the car engine 216 (e.g., the hydrocarbon fuel can be passed to a fuel line, a carburetor, or a fuel tank) thereby reducing $CO_2$ emissions from the vehicle.

The process flow arrangement of FIG. 2 cools the exhaust gases so that $CO_2$ and $H_2O$ can be separated from the exhaust gases at low temperatures in the membrane separator 108. At the same time, the temperature of the separated $CO_2$ and $H_2O$ moving towards the catalytic reactor 102B is raised by heat transfer from both the double-pipe heat exchanger 102A and coil-type heat exchanger 106. In some embodiments, the process flow arrangement utilizes the waste heat of the exhaust gases so that the reaction can be performed without external energy. The process flow arrangement can be installed on the undercarriage of the vehicle along the exhaust pipe as discussed below with respect to FIG. 3.

Figure 3:
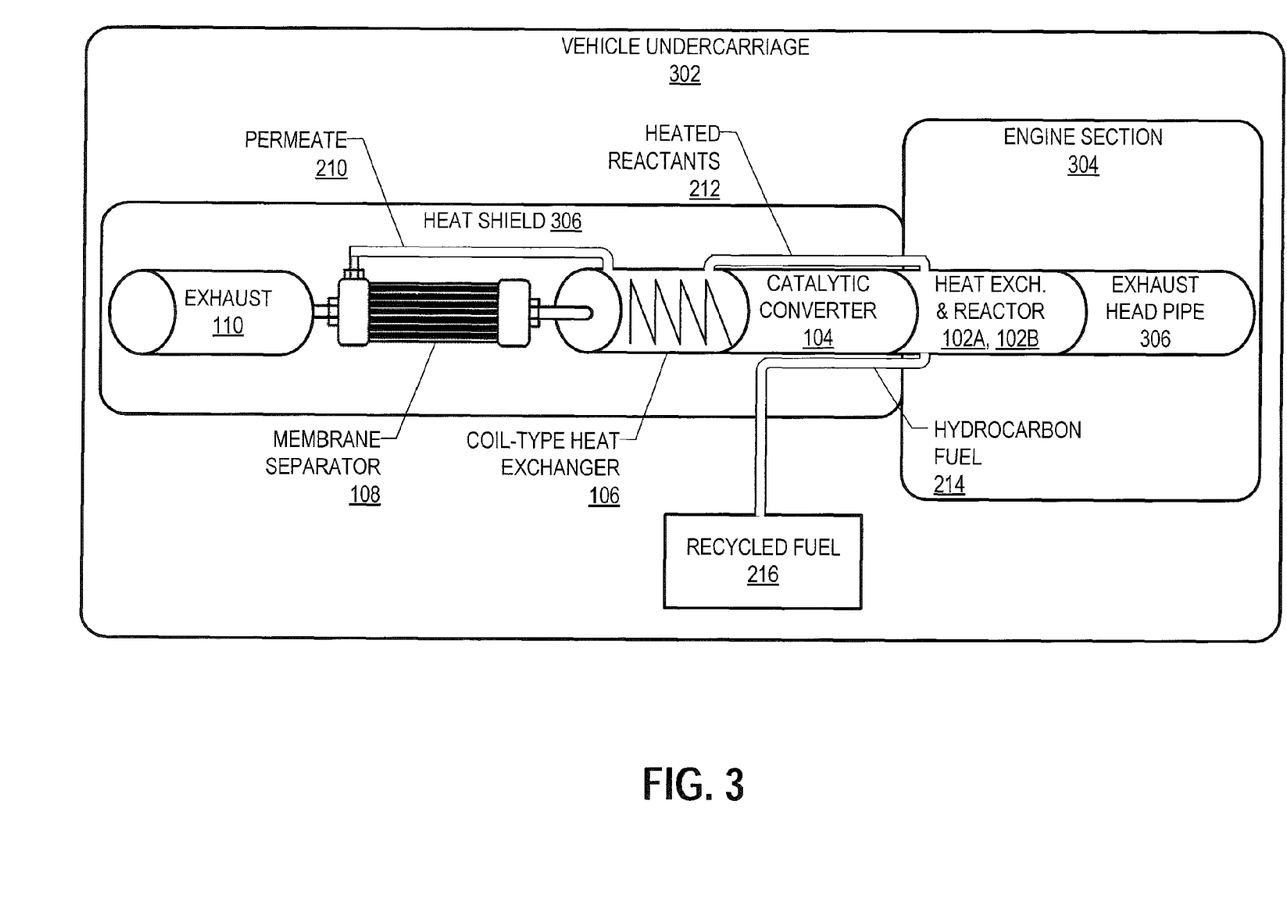
FIG. 3 shows an example apparatus in accordance with one or more embodiments of the present invention.

Turning to FIG. 3, an example apparatus installed on a vehicle undercarriage 302 is shown. An exhaust head pipe 306 of the vehicle receives exhaust gases from a combustion engine (not shown). The integrated heat exchanger 102A and catalytic reactor 102B is attached to the exhaust head pipe 306. In this example, the exhaust head pipe 306 and integrated heat exchanger 102A and catalytic reactor 102B are positioned under an engine section 304 of the vehicle (i.e., positioned under the combustion engine of the vehicle). Exhaust gases from the exhaust head pipe 306 are conveyed through the heat exchanger 102A to the catalytic converter 104.

Adjacent to the engine section 304 is a heat shield 306 for protecting the vehicle from the heat of the exhaust gas as it passes through the example apparatus. In this example, the heat shield 306 encompasses the catalytic converter 104, the coil-type heat exchanger 106, the membrane separator 108, and the exhaust 110, each of which may be substantially similar to the respective components described above with respect to FIGS. 1 and 2. As shown in FIG. 3, permeate 210 (i.e., $CO_2$ and $H_2O$) from the membrane separator 108 is conveyed to the coil-type heat exchanger 106, which transfers thermal energy from the exhaust gas to the permeate 210. The heated reactants 212 are then conveyed past the catalytic converter 104 to the catalytic reactor 102B. Further thermal energy can be transferred to the heated reactants 212 from the catalytic converter 104 and the heat exchanger 102A as the heated reactants flow towards and in the catalytic reactor 102B. The catalytic reactor 102B converts the heated reactants 212 to hydrocarbon fuel 214, which is then used as recycled fuel 216 for the vehicle.

Figure 4:
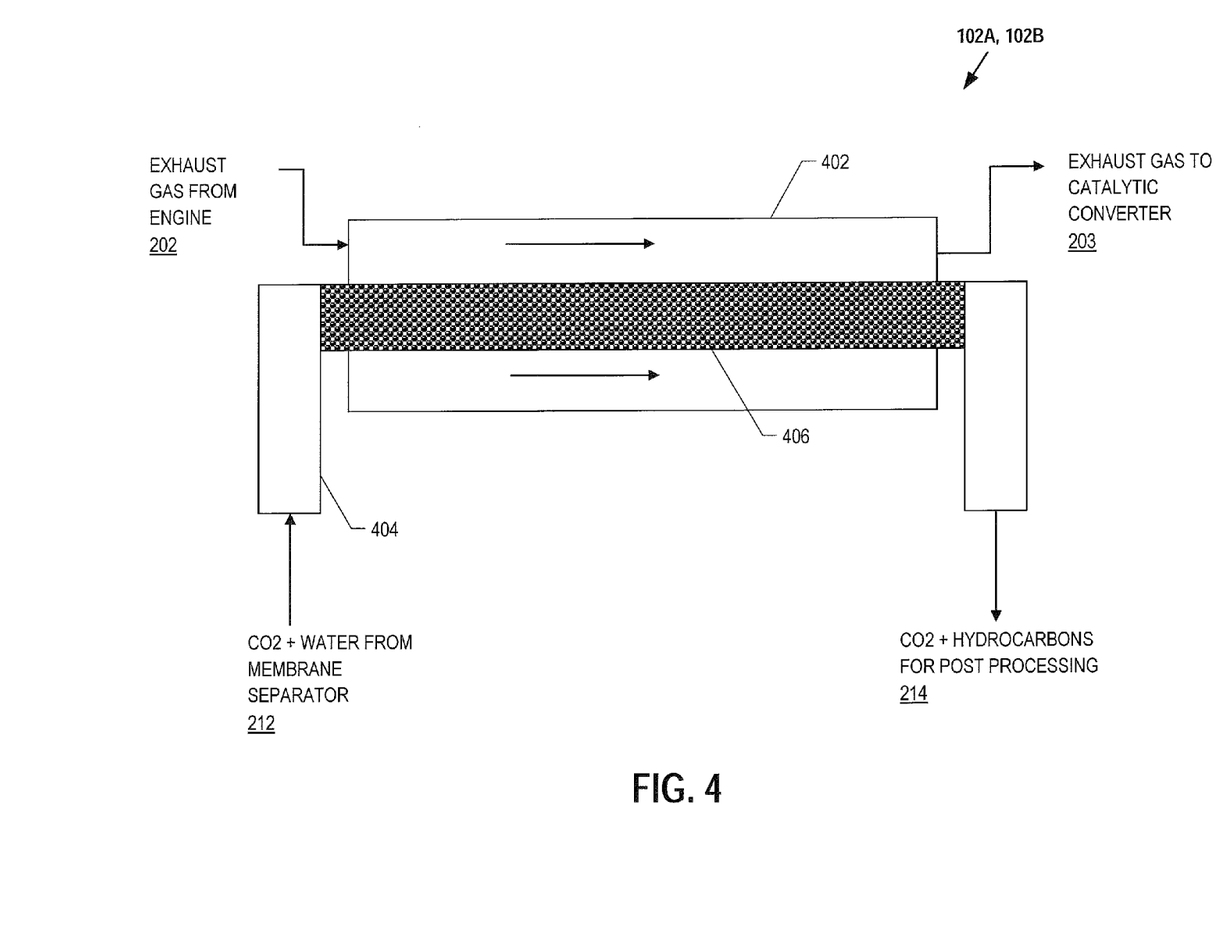
FIG. 4 shows a heat exchanger and catalytic reactor in accordance with one or more embodiments of the present invention.

Turning to FIG. 4, an example integrated heat exchanger and catalytic reactor 102A, 102B is shown. As discussed above, the integrated heat exchanger and catalytic reactor 102A, 102B can be installed between the combustion engine and the catalytic converter on a vehicle undercarriage. The exhaust gases 202 typically leave the engine at around 800 to 900° C. and are quickly cooled to about 500 to 600° C. before leaving an outer pipe 402 of the integrated heat exchanger and catalytic reactor 102A, 102B. The integrated heat exchanger and catalytic reactor 102A, 102B is positioned to recover waste heat from the exhaust gases 202 and to supplement the heat requirements of endothermic reactions taking place in an inner pipe 404 of the integrated heat exchanger and catalytic reactor 102A, 102B.

In this example, the integrated heat exchanger and catalytic reactor 102A, 102B is a standard double-pipe heat exchanger in which the inner pipe 404 holds the catalyst 406 for reaction and the outer pipe 402 provide the passage for the exhaust gas. In another example, the integrated heat exchanger and catalytic reactor 102A, 102B can be a shell and tube type heat exchanger including an inside shell having multiple tubes holding the catalyst 406, where the multiple tubes can be attached to tube-sheets at both ends of the double-pipe heat exchanger. The multiple tubes provide a larger surface area for the heat transfer. In either example, the outer pipe 402 can be properly insulated to conserve heat and facilitate the heat transfer.

Figure 5:
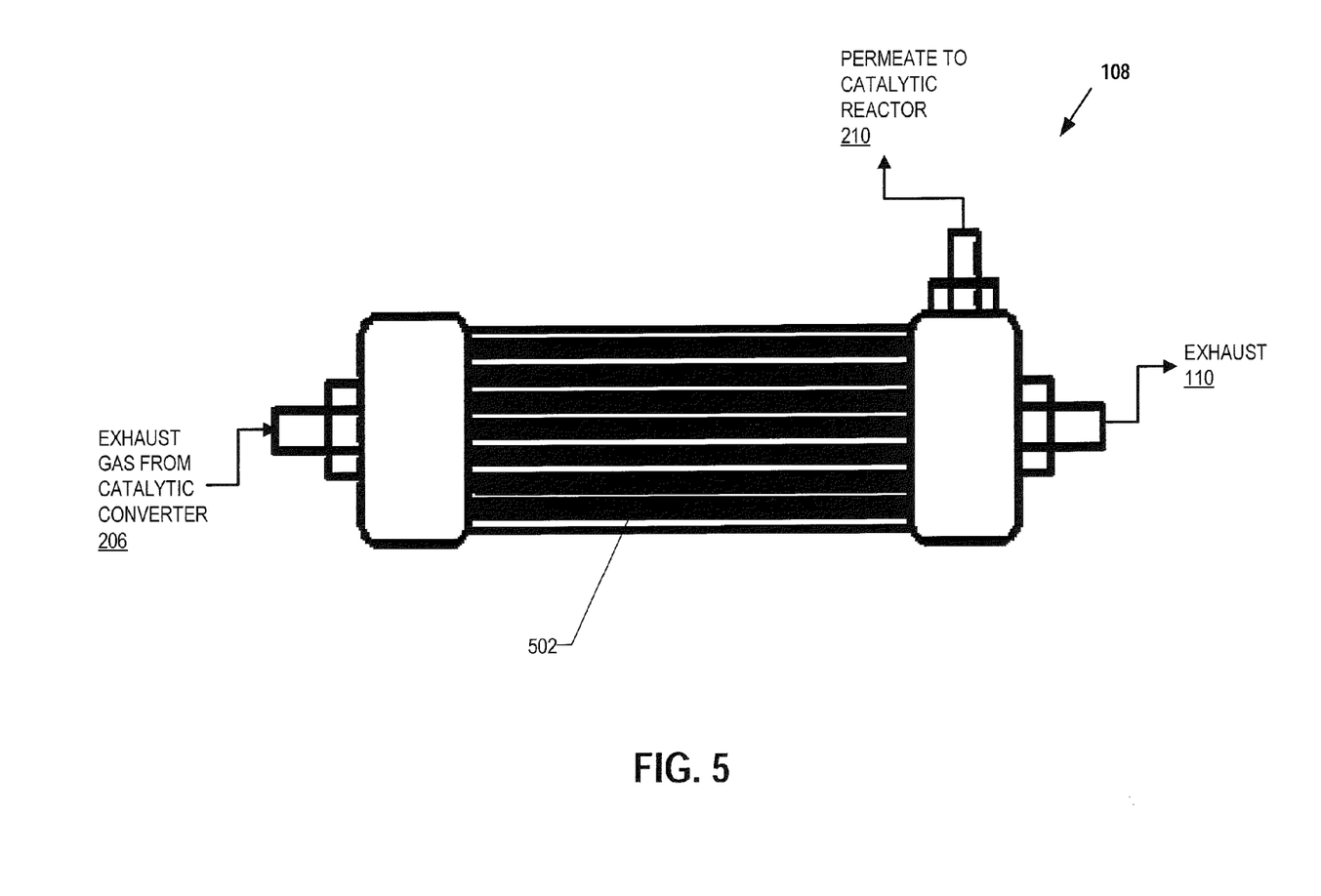
FIG. 5 shows a heat exchanger in accordance with one or more embodiments of the present invention.

Turning to FIG. 5, an example membrane separator 108 is shown. The membrane separator 108 includes a membrane 502 for separating permeate 210 ($CO_2$ and $H_2O$) from exhaust gases received from the catalytic converter 206. In some embodiments, the membrane 502 can have a hollow fiber configuration. In this case, the membrane 502 includes a selective membrane layer (not shown) that is coated on stable supports (e.g., ceramic hollow fibers, etc.). In other embodiments, the membrane 502 can have a tubular configuration. In this case, the selective membrane layer is coated on a porous tubular support (e.g., porous alumina tubes, ceramic tubes, porous metallic tubes, etc.). Optionally, sweep gas (not shown) can be injected into the membrane separator 108 to facilitate the collection of the permeate 210. Table I below shows example membranes that can be used in the membrane separator 108.

TABLE I

Example Membranes for Membrane Separator 108

| Example # | Selective membrane layer material | Support layer |
|---|---|---|
| 1 | Silica | Ceramic support with alumina/zirconia interlayer |
| 2 | Silica | Porous metallic support with zirconias or alumina interlayer |
| 3 | Cobalt embedded silica | Porous metallic/ceramic support |
| 4 | Carbon molecular sieve (CMS) | Alumina support |
| 5 | Y-type zeolites | Alumina support |
| 6 | Carbon based (prepared by carbonization of polyimides or similar polymers) | Alumina support |
| 7 | Faujasite (FAU)-type zeolite | |

The present invention is illustrated by the following example, which is presented for illustrative purposes only and is not intended as limiting the scope of the invention which is defined by the appended claims.

Example

Thermal Study

A study was performed to characterize (1) the heat released from the exhaust gases, (2) the temperature of the exhaust gases, and (3) the emission composition. In addition, thermodynamic calculations for an exhaust system (e.g., apparatus 100 of FIG. 1) were performed. Specific tasks performed in the study include:

Estimating exhaust gases temperature.
Determining an availability of energy from exhaust engine gases for operating the catalytic reactor at 800 to 850° C.
Determining a composition of exhaust emissions.

Thermodynamic simulations of engine cycles, delivered power (i.e., indicated mean effective pressure (IMEP)), engine efficiencies, fuel consumption, estimated exhaust temperatures and emissions were conducted using a gas-dynamics engine system simulation platform. Specifically, calculations were performed using the gas-dynamics engine system simulation platform with input data based on a modern single cylinder spark ignition engine as used in laboratory testing, where the ignition engine had inlet and exhaust geometry and Port Fuel Injection (PFI). The model was fully validated for different fuels and combustion conditions against available experimental data. Further, the conditions and gas dynamics of the engine inlet and exhaust geometry were based on the laboratory engine, and the heat transfer in the laboratory engine was based on typical default values. Simulations were performed with a blend of 67% iso-octane and 33% toluene measured by liquid volume, which converted to mass fractions is 62.2%/37.8% isooctane/toluene. This fuel blend is often used in laboratory testing as a reproducible representation of modern gasoline.

Analysis of the simulation results presented below in Table II show that:

- The average exhaust temperatures appear to be about 1152 K (879° C.) with the use of vaporized gasoline, where maximum temperatures are achieved at the exhaust valve opening. However, the average exhaust temperatures at the valve and at the head exit are about 1188 K (915° C.) and 1152 K (879° C.) respectively.
- Enthalpy available from exhaust gases (with a maximum exhaust temperature of 1123K (850° C.)) for gasoline is about 1.559E+05 kJ/kmol.
- For the gasoline simulation, the indicated engine efficiency obtained was 40.1%.

TABLE II

Predicted (simulated) engine performance, exhaust temperatures, fuel consumption and emissions for internal combustion engine (ICE) system (Lambda = 1, rpm = 3000)

| Fuel | 100% Gasoline to ICE (67% iso-octane 33% toluene by liq vol-62.2%/37.8% by mass, vaporized) |
|---|---|
| LHV (MJ/kg) | 43.340 |
| Indicated power (HP) | 22.060 |
| Indicated power (kW) | 16.225 |
| Indicated mean effective pressure (bar) | 11.630 |
| Indicated specific fuel consumption (kg/kWh) | 0.208 |
| Indicated engine efficiency (%) | 40.1 |
| Average exhaust temperature @ valve (K) | 1,185.0 |
| Average exhaust temperature @ exit (K) | 1,151.9 |
| Maximum exhaust temperature (K) | 1,247.0 |
| NOx (ppm) | 3,575.0 |
| NOx (g/kWh ind) | 12.0 |
| HC (ppm) | 2,861.0 |
| HC (g/kWh ind) | 4.5 |
| CO (ppm) | 1,311.0 |
| CO (g/kWh ind) | 4.1 |
| Total C in HC and CO (g Carbon/kWh ind) - approx. | 5.865 |
| Mass fraction of C in fuel entering engine | 0.862 |
| Total C in fuel entering engine (g Carbon/kWh ind) | 179.342 |
| $CO_2$ in exhaust (g $CO_2$/kWh ind) - if all C into $CO_2$ | 657.586 |
| $CO_2$ in exhaust (ppm $CO_2$) - if all C into $CO_2$ | 133,937.0 |
| $CO_2$ in exhaust (vol % $CO_2$) - if all C into $CO_2$ | 13.39370 |

Table II above shows that the average exhaust temperatures at the exhaust head exit is estimated to be around 1152 K (879° C.), and it has been shown that exhaust gases emitted from a vehicle have a temperature of around 520 to 580° C. Accordingly, the heat loss by the exhaust gases while traveling through the exhaust system is about 300 to 360° C.

Table III below shows heat liberated (in kJ/kg) from a typical gasoline fuel as a result of combustion under the effect of varying air flows. Table IV below presents the composition of gas shown in mole fraction when a fuel is burned under excess air conditions.

TABLE III

Heat liberated from fuel blend, kJ/kg for different values of combustion air.

| 100% $C_8H_{18}$ | Excess air factor ($\lambda$) |
|---|---|
| 39583.33 | 0.9 |
| 47947.06 | 1 |
| 47837.57 | 1.5 |

TABLE IV

Products mole fractions for lean fuel burning (Excess Air)

| Percentage $H_2$ in Fuel | $XCO_2$ | $XH_2O$ | $XN_2$ | $XO_2$ |
|---|---|---|---|---|
| 0 | 0.08533334 | 0.096 | 0.752 | 0.06666667 |

Energy Availability from Exhaust Gases

As an example of energy recovery from waste heat of a vehicle engine, the following are results of testing performed by Clean Power Technologies:

- With a diesel engine running at 1400 rpm and producing 405 bhp, the exhaust gas temperature is 549° C.
- At a mass flow rate of 0.46 Kg/s, the exhaust gas has an energy value of 268 kJ/s
- A heat exchanger can recover 250° C. from the exhaust gas, which is 45% of the energy (i.e., approximately 121 kJ/s).
- The system can then convert the recovered thermal energy to mechanical power with a 19 KW output, providing an energy efficiency of around 16% for the heat recovery.
- The recovered energy is equivalent to recovering about 5-10% of the vehicle engine running power.

Catalytic Converter Energy Recovery

Through research it is shown that there is also energy available from the catalytic converter of a vehicle. Specifically, the chemical reactions occurring in a catalytic converter release a total heat of $-2.8266 \times 10^6$ kJ/kmol.

Both (1) the heat energy recovered from the waste energy generated by the initial combustion of the fuel (i.e., approximately 121 kJ/s) and (2) the heat energy recovered from the catalytic converter (i.e., $-2.8266 \times 10^6$ kJ/kmol) can be used to heat the reactants provided to the catalytic reactor thereby facilitating the conversion of $H_2O$ and $CO_2$ to hydrocarbon fuel as discussed above with respect to FIGS. 1-5.

The singular forms "a", "an" and "the" include plural referents, unless the context clearly dictates otherwise. Optional or optionally means that the subsequently described event or circumstances may or may not occur. The description includes instances where the event or circumstance occurs and instances where it does not occur. Ranges may be expressed herein as from about one particular value, and/or to about another particular value. When such a range is expressed, it is to be understood that another embodiment is from the one particular value and/or to the other particular value, along with all combinations within said range.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed.

Throughout this application, where patents or publications are referenced, the disclosures of these references in their entireties are intended to be incorporated by reference into this application, in order to more fully describe the state of the art to which the invention pertains, except when these reference contradict the statements made herein.

We claim:

1. An on-board catalytic apparatus, the apparatus comprising:
    a heat exchanger operable to extract thermal energy from exhaust gases of a combustion engine, the combustion engine powering propulsion of a vehicle;
    a membrane separator operable to separate water and carbon dioxide from the exhaust gases; and
    a catalytic reactor contained in a body of the heat exchanger, the catalytic reactor operable to:
        receive the water and the carbon dioxide from the membrane separator;
        contain a reaction of the water and the carbon dioxide that produces a hydrocarbon fuel, the reaction being facilitated by a nano catalyst; and
        use the thermal energy from the heat exchanger to stimulate the reaction of the water and the carbon dioxide.

2. The apparatus as claimed in claim 1 where the nano catalyst is a multimetallic nano catalyst that comprises at least one metal from the group consisting of ruthenium, manganese and nickel.

3. The apparatus as claimed in claim 1 where the nano catalyst comprises ruthenium in a range of from 2 to 3 percent, nickel in a range of from 20 to 30 percent and manganese in a range of from 15 to 20 percent.

4. The apparatus claimed in claim 3 where the nano catalyst comprises 2 percent ruthenium, 20 percent nickel and 15 percent manganese.

5. The apparatus as claimed in claim 1 where the membrane separator comprises:
    a selective membrane layer of a group consisting of a silica-based membrane layer, a carbon-based membrane layer and a zeolite membrane layer; and
    a support layer of a group consisting of a ceramic support, a metallic support and an alumina support.

6. The apparatus as claimed in claim 1 where the catalytic reactor is encompassed by the heat exchanger such that the thermal energy is directed to a portion of the catalytic reactor holding the nano catalyst.

7. The apparatus as claimed in claim 6 where the catalytic reactor comprises multiple tubes for holding the nano catalyst, the multiple tubes providing increased surface area for receiving the thermal energy from the heat exchanger.

8. The apparatus as claimed in claim 1 where the hydrocarbon fuel comprises both ethanol and propyne.

9. The apparatus as claimed in claim 8 where the reaction is $5CO_2+5H_2O \rightarrow C_2H_5OH+H_3C-C\equiv CH+7O_2$, where $CO_2$ is carbon dioxide, $H_2O$ is water, $C_2H_5OH$ is ethanol, $H_3C-C\equiv CH$ is propyne and $O_2$ is oxygen.

10. The apparatus as claimed in claim 8 where the hydrocarbon fuel further comprises methanol.

11. The apparatus as claimed in claim 10 where the reaction is $6CO_2+7H_2O \rightarrow CH_3OH+C_2H_5OH+8.5O_2+H_3C-C\equiv CH$, where $CO_2$ is carbon dioxide, $H_2O$ is water, $CH_3OH$ is methanol, $C_2H_5OH$ is ethanol, $H_3C-C\equiv CH$ is propyne and $O_2$ is oxygen.

12. The apparatus as claimed in claim 1 further comprising a catalytic converter that is operable to oxidize carbon monoxide in the exhaust gases to carbon dioxide.

13. A process for on-board carbon dioxide conversion to a hydrocarbon fuel, the process comprising:
    extracting thermal energy from exhaust gases of a combustion engine, the combustion engine powering propulsion of a vehicle;
    separating water and carbon dioxide from the exhaust gases;
    converting the water and the carbon dioxide to hydrocarbon fuel by performing a reaction that is facilitated by a nano catalyst, the reaction being stimulated by the thermal energy extracted from the exhaust gases; and
    feeding the hydrocarbon fuel into the combustion engine for combustion;
    where the hydrocarbon fuel comprises methanol, ethanol and propyne, and
    where the reaction is $6CO_2+7H_2O \rightarrow CH_3OH+C_2H_5OH+8.5O_2+H_3C-C\equiv CH$,
        where $CO_2$ is the carbon dioxide, $H_2O$ is the water, $CH_3OH$ is methanol, $C_2H_5OH$ is the ethanol, $H_3C-C\equiv CH$ is the propyne and $O_2$ is oxygen.

14. The process as claimed in claim 13 where the nano catalyst is a multimetallic nano catalyst that comprises at least one metal from a group consisting of ruthenium, manganese, and nickel.

15. The process as claimed in claim 13 further comprising cooling the exhaust gases to a temperature in a range of from 200° C. to 300° C. prior to separating the water and the carbon dioxide from the exhaust gases.

16. The process as claimed in claim 13 further comprising oxidizing carbon monoxide in the exhaust gases to produce carbon dioxide.

* * * * *